Dec. 25, 1962  J. RODISH  3,070,397
LEVER LOCK FOR SPLIT CLAMPING RINGS
Filed Sept. 6, 1960  2 Sheets-Sheet 1
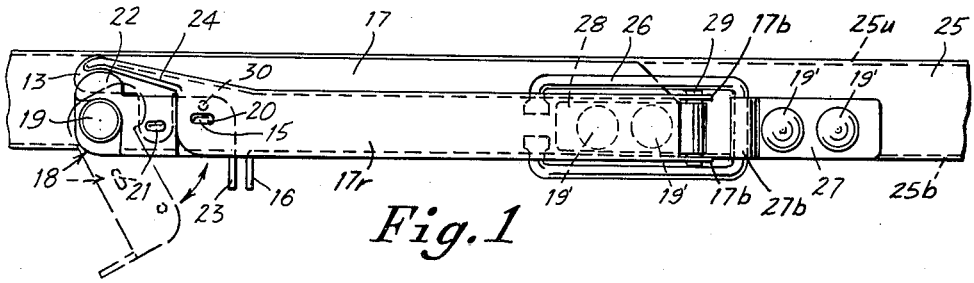
Fig.1
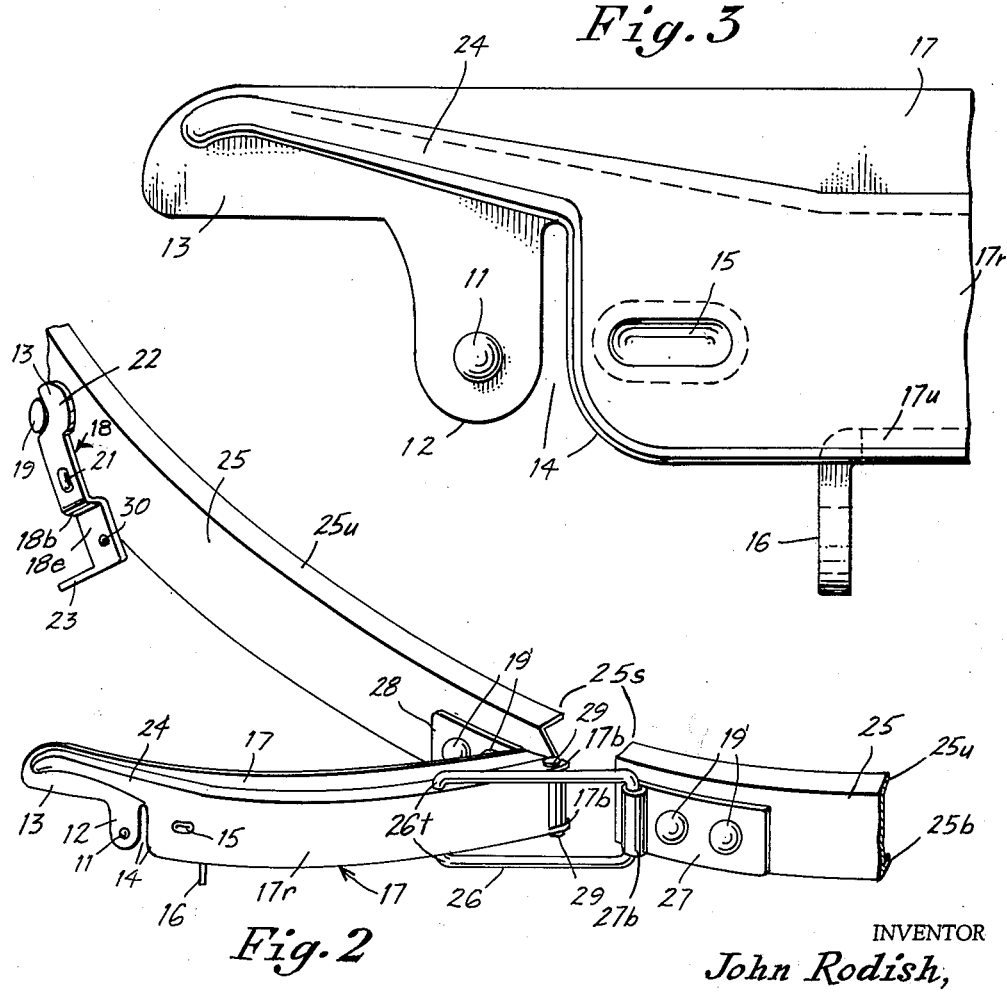
Fig.3
Fig.2
INVENTOR
John Rodish,
BY
ATTORNEY Dec. 25, 1962  J. RODISH  3,070,397
LEVER LOCK FOR SPLIT CLAMPING RINGS
Filed Sept. 6, 1960  2 Sheets-Sheet 2

INVENTOR
John Rodish,

BY
ATTORNEY

– – 3,070,397
Patented Dec. 25, 1962

3,070,397
LEVER LOCK FOR SPLIT CLAMPING RINGS
John Rodish, Cincinnati, Ohio, assignor to The Mead Corporation, Dayton, Ohio, a corporation of Ohio
Filed Sept. 6, 1960, Ser. No. 54,079
3 Claims. (Cl. 292—256.69)

The present invention relates to a lever lock for split clamping rings. More particularly, this invention pertains to a locking arm for the lever of split channel-shaped clamping rings of the type commonly employed for holding the cover on cylindrical containers, said locking arm being pivoted for swinging in a plane substantially vertical and tangent to a side of the container and having a flat cam finger engageable with longitudinal movement over a portion of the clamp lever and having a pair of detent elements die-pressed in the arm portion thereof for cooperation with mating elements similarly formed in the clamp lever, said arm having an off-setting bend therein adapted to extend into a vertically disposed slot in said lever so as to provide a balanced flexing of the arm and the lever approximately about the slot as an axis to minimize wear on the arm pivot and to insure substantially constant and reliable detent action, said arm and lever additionally having downwardly and contiguously extending apertured tabs in their locking and clamping positions for receiving therethrough a piece of wire or the like for fastening said tabs together, the tab on said arm also serving as a grip for manual or tool engagement during locking and unlocking operations.

It is an object of the present invention to provide a locking arm for the lever of split clamping rings in which the arm has a cam finger engageable with primarily longitudinal movement over a portion of said lever and has a pair of oppositely acting detent elements formed integrally therewith for force-balancing cooperation with a pair of similarly formed detent elements of the lever, for constant and reliable retention of the locking arm in locking position relatively unaffected by, and minimizing wear on the pivot mounting of said arm.

It is another object of the invention to provide such structure in which the lever has a vertically disposed notch therein and the locking arm has an off-setting bend therein adapted to enter said slot, with the detent action forces being exerted on opposite sides of said lever and said arm and on opposite sides of said slot.

It is a further object to provide such structure in which the arm and the lever have downwardly extending contiguous apertured tabs (in their interlocking positions) whereby they may be secured against inadvertent unlocking relative movements.

FIGURE 1 is a front elevational view of a preferred embodiment of the invention showing the parts in locking positions;

FIGURE 2 is a perspective view of the disclosure of FIGURE 1, showing the parts unlocked and the clamping ring expanded;

FIGURE 3 is an enlarged fragmentary elevational view of the free end of the clamp lever;

Figure 4:
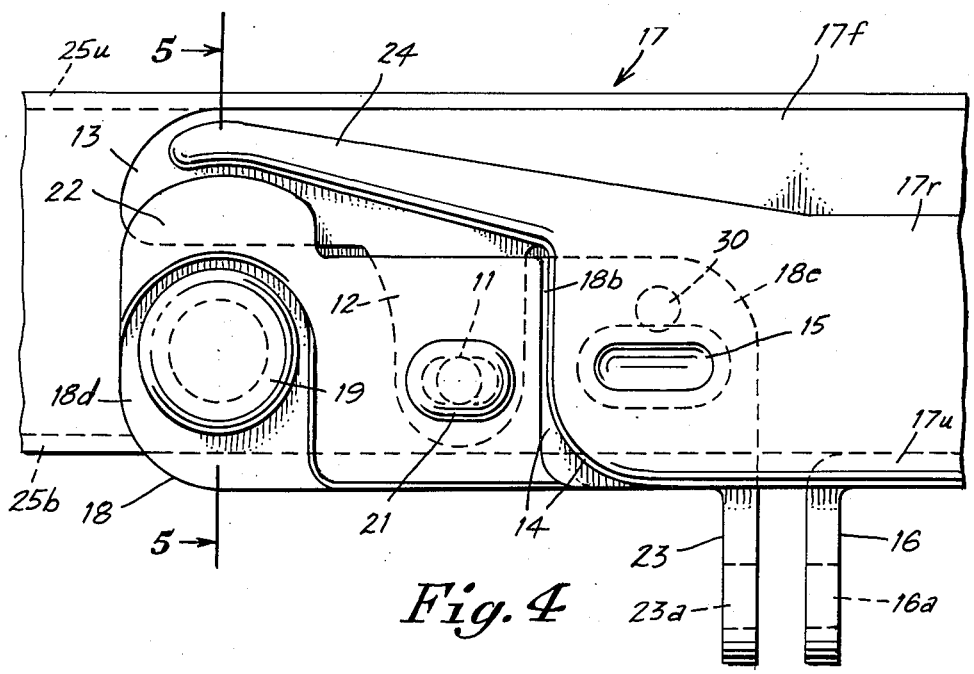
FIGURE 4 is an enlarged elevational view of the left portion of FIGURE 1.

With reference to the drawings, the numeral 1 designates a portion of a cylindrical container of laminated sheet material (FIGURE 6) for illustrating a typical application of the invention. Container 1 has a reinforcing band or chime 3 of sheet metal closely embracing the upper side walls of container 1 and inwardly crimped to define channel 5, the upper wall of which forms a seat engageable by the bottom flange 25b of the channel ring 25. If desired, flange 25b may be rolled to conform with the geometry of the crimped end of the container so as to provide additional reinforcement to the channel or locking ring 25. The upper flange 25u engages over the periphery of the cover (not shown) for the container 1 and when contracted firmly, fastens the top to the container.

The ring is split or broken at 25s to permit the cover releasing expansion illustrated in FIGURE 2.

By its construction, ring 25 is readily expanded and is contracted by a generally conventional mechanism comprising a bail-like wire link 26 the bight portion of which is journaled in a bearing portion 27b rolled at the end of the mounting tab 27. Mounting tab 27 is fixed to one end of ring 25 by rivets 19'. The free ends of the bail link 26 are inturned to form trunnions 26t which enter apertures in the die-shaped lever 17, as shown best in FIGURE 2. Lever 17 has the same curvature as the ring 25 so as to lie against the ring in its ring-contracting position of FIGURE 1.

Figure 6:
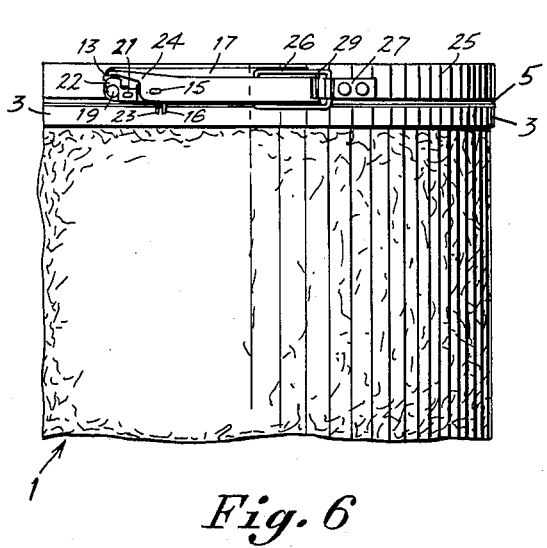

Lever 17 has flat areas 17f, 13 and 12, the latter forming a finger into which is pressed an outwardly extended rounded detent forming element 11. The central portion of lever 17 is die formed as a raised longitudinally extending channel bar shaped rigidifying part 17r thereof. The fixed end of portion 17r is cut away somewhat to provide parallel bearing tabs 17b apertured to journal the ends of a pivot pin 29. Pin 29 is held in the rolled end of the mounting tab 28 fixed to the other end of ring 25 by rivets 19'. Thus when lever 17 is swung toward ring 25 (FIGURE 2) the link 26 closes the gap at 25s to tightly constrict the ring 17 around the mating rims of the container 1 and its cover (FIGURE 6).

Figure 5:
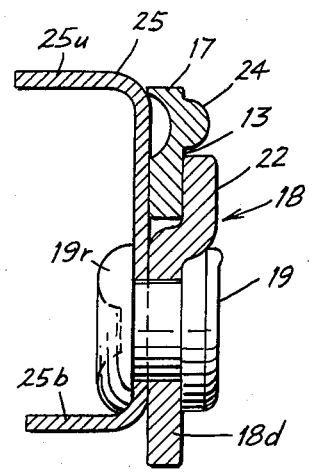
FIGURE 5 is an end elevational view in section taken on the line 5—5 of FIGURE 4; and, FIGURE 6 is a reduced scale elevational view of the disclosure of FIGURE 1 illustrating a typical application to a cylindrical container.

The locking latch generally designated 18 has a depressed area 18d (FIGURE 4) centrally apertured to receive the shank of the headed pivot pin 19 for rotation therearound. The pin 19 has its base riveted at 19r (FIGURE 5) or otherwise fixed to the ring 25. Latch arm 18 has a finger 22 adapted to swing over the flat area 13 of the lever 17 to clamp the latter against said ring. Latch arm 18 has die-formed therein an inwardly facing concavity 21 which serves as a detent forming socket for frictional engagement with the protuberance 11 previously described, when the arm 18 is in lever locking position. Arm 18 has an inwardly turned bend 18b to offset the end 18e from the other portion thereof so that part 18e will underlie the raised portion 17r of lever 17. The bend 18b mates with a notch 14 in lever 17 at the junction of portions 17r and tongue 12. The ring-underlying part 18e of latch arm 18 is provided with a dimpled protuberance 30 which cams past the inwardly pressed raised area 15 of the lever 17 so as to provide another pair of detent elements oppositely resiliently biased relative to the detent elements 11 and 21 previously described. This arrangement produces a balanced action that prevents excessive wear on the bearing structure provided by parts 19 and 18d, and also produces a more positive and reliable retention of the latch arm 18 against inadvertent unlatching.

The free end of latch arm 18 and the underturned flange 17u of the lever 17 are provided respectively with facing downturned tabs 23 and 16 which are apertured at 23a and 16a to receive a piece of wire or the like for fastening the latch arm against unlatching movement. Tab 23 also serves as a grip element for manual or tool engagement in manipulating the latch.

While the product herein described is for the purpose of illustration only, it is to be understood that the present invention includes all modifications and equivalents which fall within the scope of the invention which is defined by the appended claims.

What is claimed is:

1. In combination with a split annular band having means bridging the split therein for constricting a band around an object, having an arcuate lever pivoted to said band adjacent said split and swingable to and from a position closely overlying said band, and further having split-spanning means operable by said lever for object-clampingly constricting said band when said lever is in said position, said lever having a flat end portion adapted to lie flat against said band and an outwardly raised channel shaped lever-rigidifying portion defining the major portion of said lever with a vertical slot therein adjacent the junction of said lever portions, a latch arm of strap form having an offsetting bend medially thereof adapted to be received in said slot, pivot means for anchoring one end of said latch arm to said band adjacent the free end of said lever for swinging in a plane substantially tangent to said band to and from a position aligned with said lever, a locking finger extending laterally from said arm adjacent said pivot means so as to cammingly swing over and along said flat end portion of said lever to clamp the latter against said band when said latch arm is swung into alignment with said lever and with its free offset end underlying said lever beyond said slot therein, and oppositely biased pairs of cooperating detent elements formed in said lever and latch arm by dimple-type distortions thereof and located on opposite sides of said slot, whereby a double and balanced action retaining of said arm in locking position is provided, the same also relatively minimizing and being unaffected by wear or otherwise caused looseness in said pivot means.

2. Structure according to claim 1 with one pair of said detent elements comprising a protuberance and a mating depression, the other pair of detent elements comprising a pair of protuberances adapted to cam past each other into arm-movement-arresting relative positions.

3. Structure according to claim 1 with said lever and arm having tabs with apertures therein that align when said arm and lever are in locking positions, whereby the same can be wired or otherwise tied together in said positions.

References Cited in the file of this patent

UNITED STATES PATENTS

| | | |
|---|---|---|
| 1,522,998 | Buerger | Jan. 13, 1925 |
| 2,579,975 | Scott | Dec. 25, 1951 |
| 2,864,638 | Nelson | Dec. 16, 1958 |